(12) United States Patent
Niewiadomski et al.

(10) Patent No.: US 10,829,099 B2
(45) Date of Patent: Nov. 10, 2020

(54) AUTO-CALIBRATED BRAKE CONTROL FOR VEHICLES AT LOW SPEEDS

(71) Applicant: Ford Global Technologies, LLC, Dearborn, MI (US)

(72) Inventors: Luke Niewiadomski, Hamtramck, MI (US); Theresa Lin, Berkeley, CA (US); Chen Zhang, S Rockwood, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 291 days.

(21) Appl. No.: 15/979,137

(22) Filed: May 14, 2018

(65) Prior Publication Data

US 2019/0344763 A1 Nov. 14, 2019

(51) Int. Cl.
*B60D 1/00* (2006.01)
*B60T 8/172* (2006.01)
*B60D 1/36* (2006.01)
*B60W 10/184* (2012.01)
*B60W 10/04* (2006.01)
*B60W 30/18* (2012.01)

(52) U.S. Cl.
CPC ............... *B60T 8/172* (2013.01); *B60D 1/36* (2013.01); *B60W 10/04* (2013.01); *B60W 10/184* (2013.01); *B60W 30/181* (2013.01); *B60W 30/18109* (2013.01); *B60T 2270/413* (2013.01); *B60W 2520/105* (2013.01); *B60W 2552/15* (2020.02); *B60W 2552/40* (2020.02)

(58) Field of Classification Search
CPC .................................. B60D 1/36; B60T 8/172
See application file for complete search history.

(56) References Cited

U.S. PATENT DOCUMENTS

| 6,208,927 | B1 | 3/2001 | Mine | |
|---|---|---|---|---|
| 7,438,368 | B2 * | 10/2008 | Kohler | B60D 1/065 188/1.11 E |
| 8,068,019 | B2 * | 11/2011 | Bennie | B60T 8/1708 340/442 |
| 8,746,812 | B2 | 6/2014 | Albright | |
| 9,327,705 | B2 | 5/2016 | Schwitters | |
| 2006/0214506 | A1 * | 9/2006 | Albright | B60T 17/22 303/123 |
| 2013/0124058 | A1 * | 5/2013 | Perlick | B60T 7/20 701/70 |
| 2013/0226390 | A1 * | 8/2013 | Luo | B60D 1/36 701/25 |

(Continued)

FOREIGN PATENT DOCUMENTS

CN 104260722 A 1/2015

*Primary Examiner* — Truc M Do
(74) *Attorney, Agent, or Firm* — David R. Stevens; Stevens Law Group (57) ABSTRACT

Certain driver-assist features of a vehicle require incredibly precise longitudinal control of the vehicle. Achieving the precise control requires up-to-date knowledge of performance parameters of a brake system of the vehicle, which may vary extensively based on a wide set of influences outside the control of the brake system. The present disclosure proposes techniques to determine these parameters, for example, by stopping the vehicle early in maneuvering in order to study the brake performance, so that precise longitudinal control of the vehicle may be realized.

18 Claims, 5 Drawing Sheets

(56) References Cited

U.S. PATENT DOCUMENTS

2014/0046566 A1* 2/2014 Maitlen ................ B60T 8/1701
  701/70
2015/0175140 A1  6/2015 Shimizu
2018/0154874 A1* 6/2018 Kulkarni ................... B60T 7/20
2018/0215358 A1* 8/2018 Hall ..................... B60T 8/1708

* cited by examiner

```
┌─────────────────────────────────────────────────────────────────────┐
│ CALIBRATE, BY A PROCESSOR ASSOCIATED WITH A VEHICLE, A PLURALITY   │
│ OF BRAKE PARAMETERS OF A BRAKE SYSTEM OF THE VEHICLE BY            │
│ IDENTIFYING VALUES OF THE BRAKE PARAMETERS IN MANEUVERING THE      │
│ VEHICLE TO A COMPLETE STOP                                          │
│ 510                                                                 │
│                                                                     │
│   ┌─────────────────────────────────────────────────────────────┐  │
│   │ MANEUVER THE VEHICLE TO TRAVEL AT A FIRST SPEED             │  │
│   │ 512                                                          │  │
│   └─────────────────────────────────────────────────────────────┘  │
│                                                                     │
│   ┌─────────────────────────────────────────────────────────────┐  │
│   │ APPLY A BRAKE PROFILE TO DECELERATE THE VEHICLE             │  │
│   │ 514                                                          │  │
│   └─────────────────────────────────────────────────────────────┘  │
│                                                                     │
│   ┌─────────────────────────────────────────────────────────────┐  │
│   │ MONITOR THE BRAKE PARAMETERS AS THE VEHICLE SLOWS TO A STOP │  │
│   │ 516                                                          │  │
│   └─────────────────────────────────────────────────────────────┘  │
│                                                                     │
│   ┌─────────────────────────────────────────────────────────────┐  │
│   │ CALIBRATE THE BRAKE PARAMETERS BASED ON THE MONITORING       │  │
│   │ 518                                                          │  │
│   └─────────────────────────────────────────────────────────────┘  │
└─────────────────────────────────────────────────────────────────────┘
                                  │
                                  ▼
┌─────────────────────────────────────────────────────────────────────┐
│ MANEUVER, BY THE PROCESSOR, THE VEHICLE TO STOP AT A PREDETERMINED │
│ POSITION WITH A SUB-CENTIMETER PRECISION BY APPLYING THE BRAKE     │
│ PARAMETERS AT THE IDENTIFIED VALUES                                 │
│ 520                                                                 │
│                                                                     │
│   ┌─────────────────────────────────────────────────────────────┐  │
│   │ MANEUVER THE VEHICLE TO TRAVEL AT A SECOND SPEED            │  │
│   │ 522                                                          │  │
│   └─────────────────────────────────────────────────────────────┘  │
│                                                                     │
│   ┌─────────────────────────────────────────────────────────────┐  │
│   │ DECELERATE THE VEHICLE TO STOP AT THE PREDETERMINED          │  │
│   │ POSITION BY USING THE CALIBRATED BRAKE PARAMETERS            │  │
│   │ 524                                                          │  │
│   └─────────────────────────────────────────────────────────────┘  │
└─────────────────────────────────────────────────────────────────────┘
```

FIG. 5

AUTO-CALIBRATED BRAKE CONTROL FOR VEHICLES AT LOW SPEEDS

TECHNICAL FIELD

The present disclosure generally relates to vehicle controls and, more particularly, to precise braking for a vehicle.

BACKGROUND

Certain driver-assist features for vehicles require incredibly precise longitudinal control of the vehicle while operating at a very low speed. As an example, an automatic hitch system of a vehicle typically performs the function of automatically maneuvering of the vehicle to align the vehicle's hitch ball to a trailer tongue coupler. The longitudinal control of the vehicle needs to be incredibly precise, such that the final stopping point for the vehicle places the hitch ball directly underneath the trailer coupler.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the context of an automatic hitch system, the requirement for precision in automated longitudinal control is high. For instance, in a simulation of an automatic hitch system, the required precision may be 9 mm, which is unprecedented in typical vehicle control systems. Additionally, a parking system may be used to position a vehicle in a tight parking space, such that an overshoot by a longitudinal controller of the vehicle may cause a collision.

Figure 1:
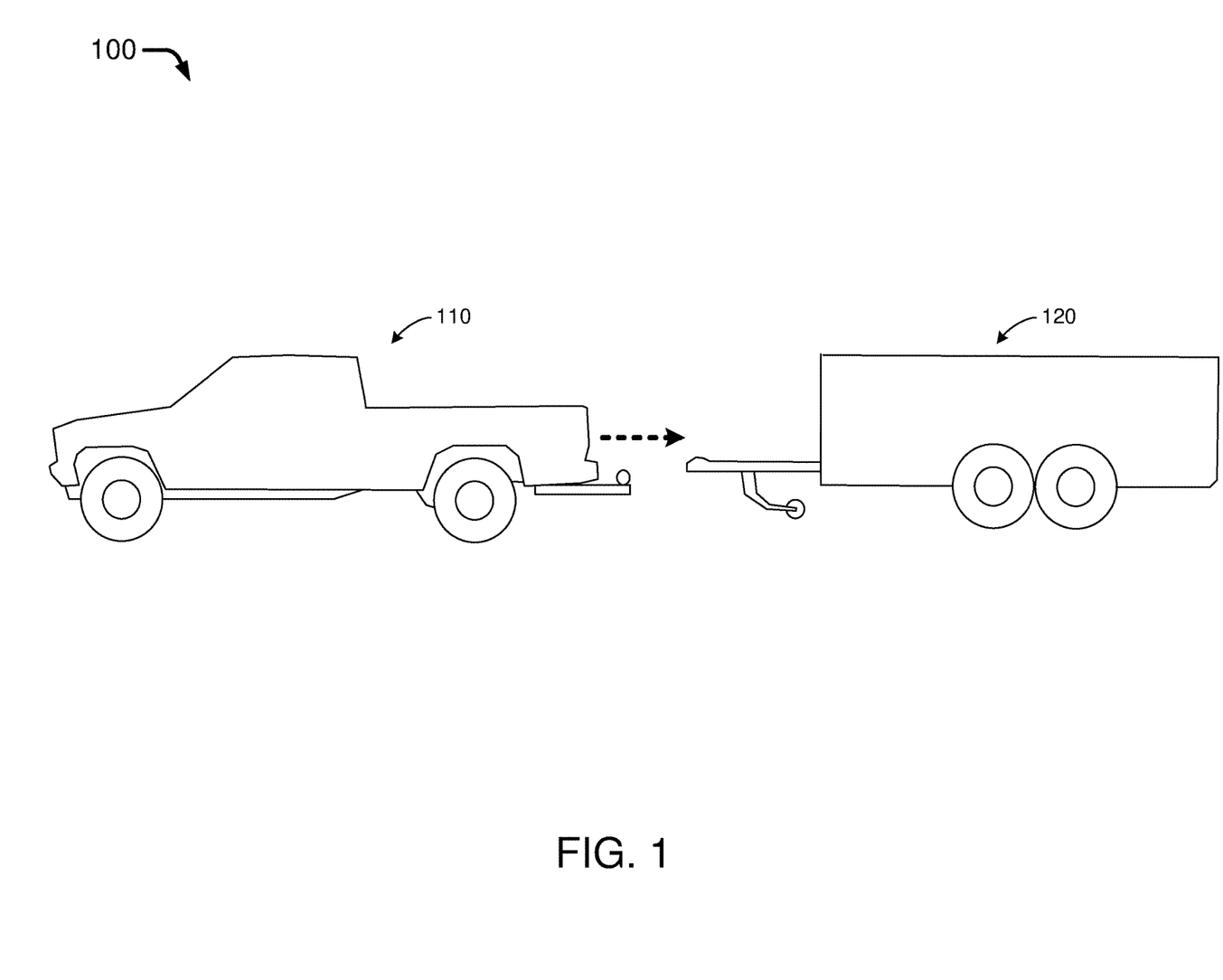
FIG. 1 is a diagram of an example scenario in which various embodiments in accordance with the present disclosure may be implemented.

FIG. 1 illustrates an example scenario 100 in which various embodiments in accordance with the present disclosure may be implemented. Specifically, in scenario 100 an automatic hitch system in accordance with the present disclosure may be implemented in vehicle 110 to latch and tow a trailer 120. In an event that vehicle 110 undershoots or overshoots a target position, a user (e.g., the driver or a passenger of vehicle 110) may not be able to directly lower trailer 120 onto vehicle 110. This would effectively defeat the purpose for using the automatic hitch system. Besides, an overshoot may result in a collision between vehicle 110 and trailer 120.

To achieve extremely precise automated longitudinal control, the automatic hitch system needs to have the ability to control actuation of a brake system of vehicle 110 in a near-exact and robust manner. In order to do so, it is imperative to understand the relationship between brake torque command, system deceleration, and vehicle speed. However, this relationship is subject to influence by a wide set of factors, making a prediction of an actual response of the brake system to control commands extremely difficult. Factors influencing the relationship between brake torque command, system deceleration, and vehicle speed may include, for example and without limitation, the following: ambient temperature of environment, temperature of components of the brake system such as brake fluid and brake pads (e.g., cold components versus hot components due to usage), wear condition of brake components (e.g., worn versus new brake pads), dryness of braking components (e.g., dry versus rainy conditions), surface gradient or slope of the road, surface friction due to tire wear, road surface and tire interaction (e.g., surface friction coefficient μ), tire tread type, evenness of surface (e.g., rocky dirt versus flat asphalt), design of brake actuator, brake fluid pressure, wheel diameter (e.g., due to tire wear or tire base size), weight of vehicle and distribution of the weight on each tire, network and processing delays of the brake actuator, actuation delays and performance of the brake actuation system, and system response of low-level brake control. In an event that the brake system responded consistently and precisely, it would be straightforward to develop a controller algorithm to achieve precise longitudinal control of the vehicle. However, it is not feasible to model all aspects of possible influences and execute a control algorithm correspondingly, as the problem space is rather large.

Under a proposed scheme of the present disclosure, the relationship between (1) a brake torque command, (2) vehicle deceleration and (3) vehicle speed may be determined with respect to rendering driver-assist features for vehicle 110 in scenario 100. The proposed scheme may involve executing a "practice run" under real-world conditions, in which vehicle 110 may be stopped early in an automated hitching maneuver for collection of data which may be applied later towards the end of the automated maneuver to control vehicle 110 to stop at a precise position or location (e.g., within 1 cm or several millimeters of a predetermined position for connecting with trailer 120). Specifically, under the proposed scheme, at first vehicle 110 may be controlled to move at a steady and low speed (e.g., in backing up towards trailer 120), and a brake command profile may be applied while speed data of vehicle 110 is being collected. The collected speed data of vehicle 110 may then be analyzed. Later, in the automated maneuver, a brake profile may be commanded during a final maneuvering sequence of a driver-assist feature, during which vehicle 110 may be brought to a standstill or full stop at a precise position (herein interchangeably referred as the "final target position" and "target position").

Figure 2:
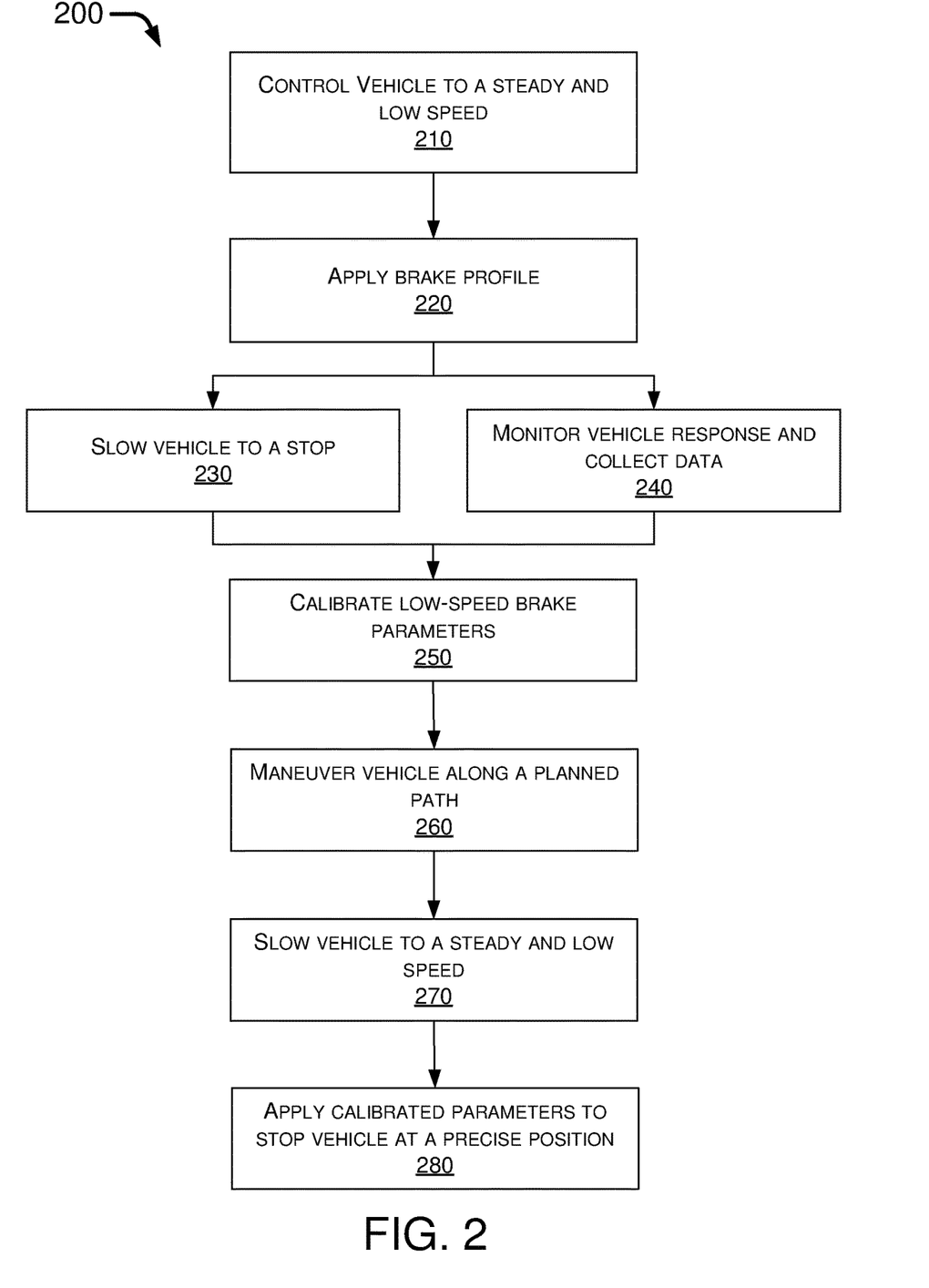
FIG. 2 is a diagram of an example process in accordance with an embodiment of the present disclosure.

FIG. 2 illustrates an example process 200 in accordance with the present disclosure. Process 200 may include one or more operations, actions, or functions shown as blocks such as 210, 220, 230, 240, 250, 260, 270 and 280 of FIG. 2.

Although illustrated as discrete blocks, various blocks of process 200 may be divided into additional blocks, combined into fewer blocks, or eliminated, depending on the desired implementation. Moreover, process 200 may be partially or entirely repeated. For illustrative purposes and without limitation, the following description of process 200 is provided in the context of scenario 100 with process 200 implemented in vehicle 110. Process 200 may begin with block 210.

At 210, a processor of a longitudinal controller of vehicle 110 may command braking and powertrain systems of vehicle 110 to achieve a steady, or constant, and low speed (e.g., at 10 or 5 miles per hour). As vehicle speed is a highly influential factor on brake parameters, setting the speed of vehicle 110 at a constant allows the relationship between commanded torque and vehicle deceleration to be monitored and analyzed directly. The speed of vehicle 110 at this stage may be chosen to match a final approach speed of vehicle 110 at the end of the overall operation at 270. The brake parameters that are observed or otherwise monitored here may be directly used at 270 of process 200 in a final stopping procedure, at the same speed for which the brake parameters apply. Here, this steady and low speed is denoted as v(low). Process 200 may proceed from 210 to 220.

At 220, the processor of the longitudinal controller may apply a brake profile to the brake system of vehicle 110 to bring vehicle 110 to a full stop. The processor may gradually increase, at a predetermined rate, the value of a commanded brake torque, for which the processor may transmit or otherwise issue a command to the brake system to request the brake system to apply the commanded brake torque. The predetermined rate may be chosen to match a brake gain of the brake system for the final stopping procedure. In this way, the parameters calibrated at 250 may be directly applicable, such that actions, features and/or functions performed at 210 and 220 may be deemed as a "practice run" in preparation for 270 and 280 of process 200. It is noteworthy that, throughout the overall automated maneuvering operation, the actions, features and/or functions of 220 may be performed at any point prior to performing actions, features and/or functions of 270 and 280. For instance, operations of 220 may suitably be performed at the very beginning of the operation, when vehicle 110 is first launched, or near the very end of the operation. Process 200 may proceed from 220 to 230 and 240.

In an event that the actions, features and/or functions of 220 are performed near the end of the operation, vehicle 110 needs to be brought to a full stop early enough to allow adequate distance to the final target position in order to fully perform actions, features and/or functions of 270 and 280. As such, worst-case brake parameters may be assumed at 220 to allow additional travel distance without running out of physical space to properly perform actions, features and/or functions of 270 and 280. Otherwise, there may be a risk of vehicle 110 overshooting the final target position.

During the actions, features and/or functions of 220, a human-machine interface (HMI) warning may be used to notify the driver of vehicle 110 as to the reason behind the vehicle stopping sequence. For example, a message on a display screen of the HMI may read, "Calibration in Progress", or something to that effect.

At 230, in response to the application of brakes at 220, vehicle 110 may slow to a stop. Process 200 may proceed from 230 to 250.

At 240, the processor of the longitudinal controller may monitor response of vehicle 110 by measuring certain vehicle information and parameters while vehicle 110 is slowing to a stop at 230. For instance, brake parameters such as (1) a commanded brake torque instructed by the processor to the brake system, (2) an actual brake torque applied by the brake system to slow down vehicle 110, and (3) a speed of vehicle 110 while vehicle 110 is decelerating as braked are applied may be monitored or otherwise measured with data thereof collected over time. For instance, data pertaining to at least the aforementioned brake parameters may be collected from the start of the actions, features and/or functions of 220 until vehicle 110 reaches a full stop. Process 200 may proceed from 240 to 250.

The data collected during the actions, features and/or functions of 240 may be used as feedforward data for control at 270 and 280. During the actions, features and/or functions of 270 and 280, feedback data may also be used in conjunction with the feedforward data.

It is noteworthy that accurate low-speed measurement data is required to perform 240 satisfactorily. Generally speaking, vehicle speed may be determined via wheel tick sensors, which are accurate at higher speeds but insufficient below approximately 1 kilometer per hour (kph). This is because of the large time delay between discrete wheel ticks when the vehicle is traveling at such low speeds. To overcome this limitation, under the proposed scheme, the vehicle speed of vehicle 110 may be determined by radar odometry, such as for example, through the analysis of relative position shifts of one or more tracked points. Other suitable methods, as well as a combination of various methods, may also be utilized for speed measurement.

Figure 3:
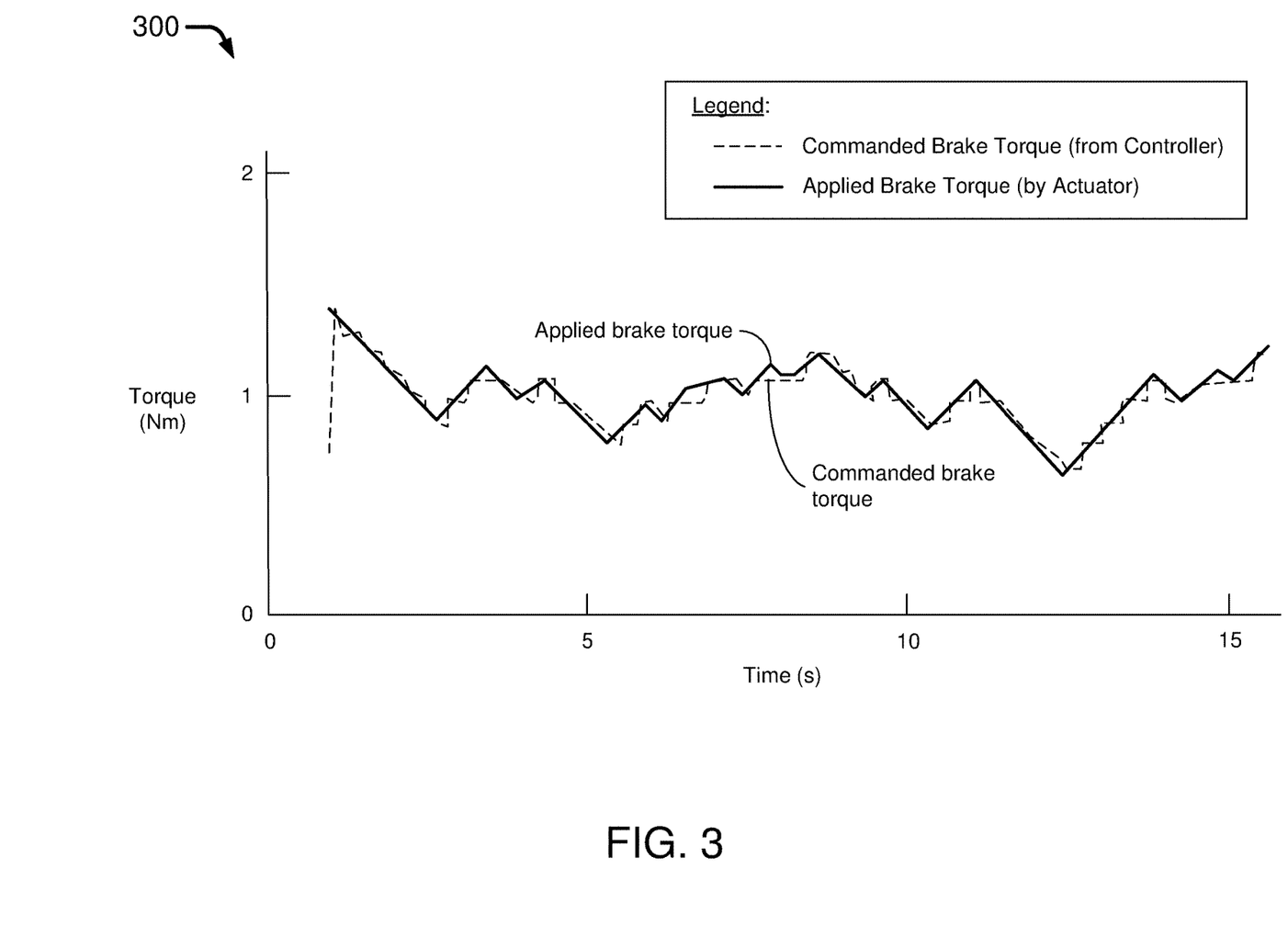
FIG. 3 is a diagram of an example chart of comparison of commanded torque versus applied torque in accordance with an embodiment of the present disclosure.

It is also noteworthy that commanded brake torque and applied brake torque tend to have distinctly different values. The commanded brake torque is the requested value from the processor of the longitudinal controller to brake actuators of the brake system of vehicle 110. Applied brake torque is the measured torque applied against the direction of travel via the brake actuators. Applied brake torque may be different than the commanded brake torque in terms of value, response rate, and stepped response alignment. FIG. 3 illustrates an example chart 300 of comparison of commanded torque versus applied torque in accordance with an embodiment of the present disclosure.

At 250, the processor of the longitudinal controller may analyze the relationship between commanded brake torque and vehicle deceleration, at a certain steady low speed (e.g., 1 kph), and calibrate brake parameters for the low speed accordingly. Specifically, the amount of distance from the initiation of 220 (e.g., at the onset of application of the brake profile) until full stop, as well as the travel distance, may be measured and the values of which may be recorded. For example, the amount of distance thus traveled may be represented mathematically below.

$$d(\text{to stop}) = \int_{t=start}^{t=standstill} v(t) dt$$

Here, d(to stop) denotes the distance vehicle 110 traveled since the beginning of application of the brake profile (e.g., at time t=start) until vehicle 110 reaches a standstill or full stop (e.g., at time t=standstill). Additionally, v(t) is the measured vehicle speed over time. The traveled distance, d(to stop), may be utilized as a trigger for beginning the actions, features and/or functions performed at 280. Process 200 may proceed from 250 to 260.

At 260, in an event that further travel or movement of vehicle 110 towards the final target position is required, the processor of the longitudinal controller may maneuver vehicle 110 towards the final target position at a normal system speed different from the aforementioned steady and low speed. For example, in an event that vehicle 110 is still 10 meters away from the final target position, the processor of the longitudinal controller may plan a path of travel for vehicle 110 to move from its current position to the final target position, and then control vehicle 110 to accelerate to a safe speed and maneuver along the planned path. Process 200 may proceed from 260 to 270.

At 270, the processor of the longitudinal controller may reduce the speed of vehicle 110 to a very low, yet steady, speed, which may be the same speed maintained at 210 and denoted as v(low).

It is noteworthy that the actions, features and/or functions performed at 270 need to be initiated with enough distance to the final target position to allow successful completion of the actions, features and/or functions of 270 and 280. Referring to the mathematical expression below, the actions, features and/or functions of 270 may be initiated when d(begin to slow) is equal to the measured distance to the final target position, d(target).

$$d(\text{begin to slow}) = d(\text{to stop}) + d(\text{to slow}) + d(\text{buffer})$$

Here, d(target) denotes the measured distance from vehicle 110 to the final target position, d(begin to slow) denotes the distance to the final target position at which the actions, features and/or functions of 270 may be initiated, d(to stop) denotes the distance required to bring vehicle 110 from the low speed v(low) to a full stop. The value of d(to stop) may be determined at 250. Moreover, d(to slow) denotes the estimated distance required to bring vehicle 110 from its current speed to the steady and low speed v(low). The value of d(to slow) may be chosen as a constant value from nominal situations. Thus, d(to slow) may not be extremely accurate, therefore a buffer value d(buffer) may be used to prevent overshooting the final target position. Furthermore, d(buffer) denotes a constant chosen to ensure that vehicle 110 slows soon enough, so that vehicle 110 does not run out of space to perform the actions, features and/or functions of 280. The value of d(buffer) may be large enough to assume worst-case conditions (e.g., slowest brake response). Accordingly, when d(target)=d(begin to slow), the processor of the longitudinal controller may begin the slowdown of vehicle 110 until vehicle 110 reaches v(low). Process 200 may proceed from 270 to 280.

At 280, the processor of the longitudinal controller may apply the brake profile from 220 using values of the calibrated brake parameters recorded during 250 in order to stop vehicle 110 at the final target position. The actions, features and/or functions of 280 may be initiated when d(target)=d(to stop). Accordingly, as d(to stop) was determined previously at 250 under real-world conditions, vehicle 110 may be brought to a full stop precisely at the final target position.

Figure 4:
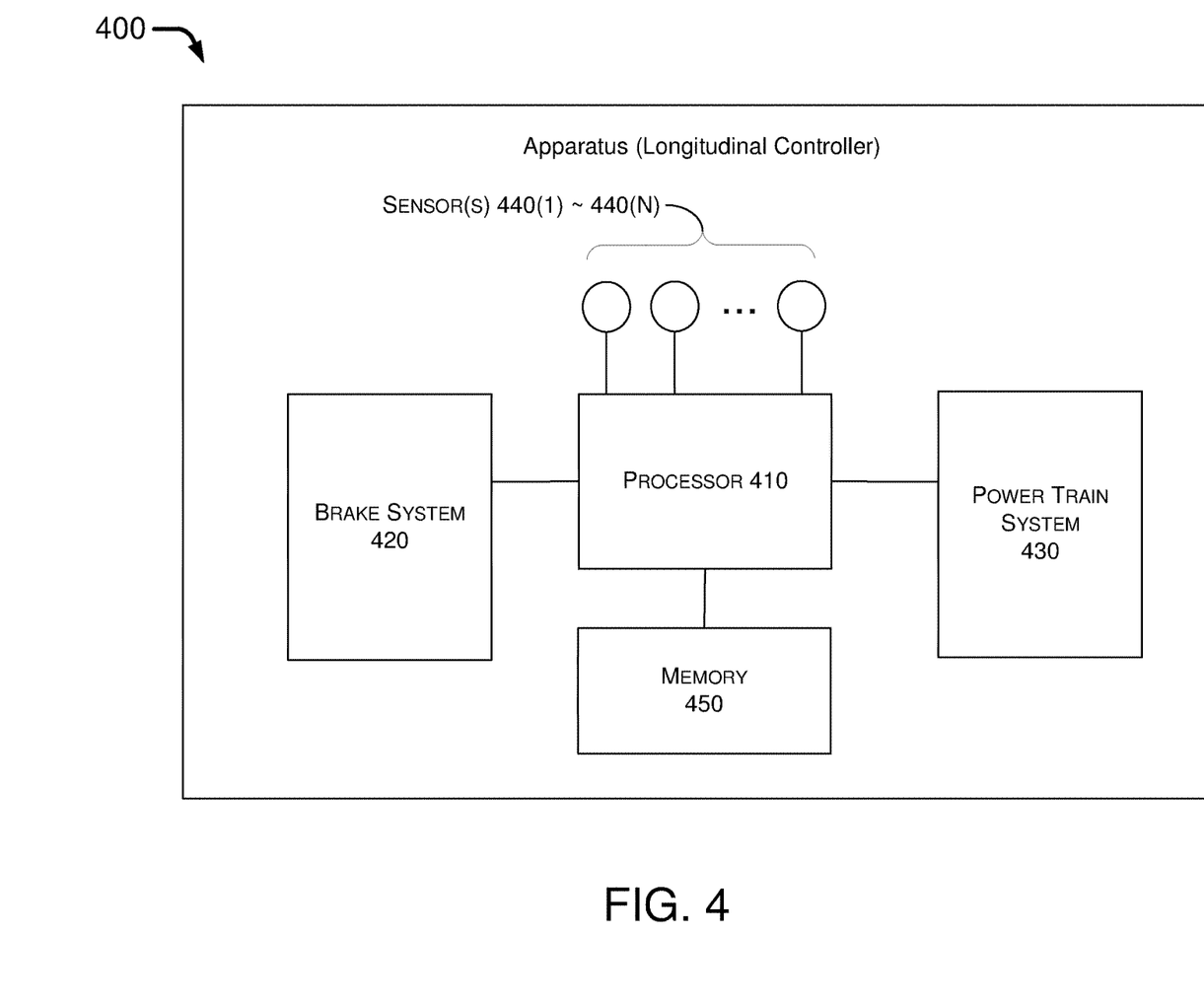
FIG. 4 is a diagram of an example apparatus in accordance with an embodiment of the present disclosure.

FIG. 4 illustrates an example apparatus 400 in accordance with an embodiment of the present disclosure. Apparatus 400 may include a number of components pertinent to the present disclosure as well as a number of components not directly pertinent to the present disclosure. Thus, in the interest of brevity and not obscuring illustration of pertinent components, FIG. 4 shows those components pertinent to various embodiments of the present disclosure without showing those components that are not directly pertinent to the present disclosure.

Referring to FIG. 4, apparatus 400 may include a processor 410, a brake system 420, a powertrain system 430, and a number of sensors 440(1)~440(N) with N being a positive integer greater than 1. Apparatus 400 may be an example implementation of a longitudinal controller described herein.

Processor 410 may include one or more integrated-circuit (IC) chips. Brake system 420 may include a number of brakes, each for a respective one of the wheels of the vehicle (e.g., vehicle 110), and associated actuators. Each of the brakes of brake system 420 may be configured to inhibit a motion of the respective wheel to thereby slow and/or stop the respective wheel (and the vehicle). Powertrain system 430 may include an engine, a transmission system, drive shafts, differentials and a final drive system (e.g., wheels of the vehicle). Each of sensors 440(1)~440(N) may be capable of sensing, detecting or otherwise measuring a respective parameter of a respective aspect of the vehicle and generate respective sensor data as a result of the sensing, detecting or measuring. The sensors 440(1)~440(N) may include a camera, an image sensor, a radar, a pressure sensor, a gyroscope, an accelerometer, a thermometer and/or any other suitable sensors. For instance, the sensors 440(1)~440(N) may include sensors capable of sensing, detecting or otherwise measuring one or more conditions of vehicle 110 such as, for example and without limitation, a condition of each of the brakes of brake system 420, a distance between a current position of the vehicle and a target position, an angular velocity or speed of one or more wheels of the vehicle, and a number of aspects of a brake torque applied to one or more of the wheels. The aspects of the applied brake torque may include the value/amount, response rate and stepped response alignment of the brake torque.

Apparatus 400 may also include a memory 450, which may be accessible by processor 410 and capable of storing data (e.g., sensor data collected or otherwise received from the sensors 440(1)~440(N)). Memory 450 may include a type of random-access memory (RAM) such as dynamic RAM (DRAM), static RAM (SRAM), thyristor RAM (T-RAM) and/or zero-capacitor RAM (Z-RAM). Alternatively, or additionally, memory 450 may include a type of read-only memory (ROM) such as mask ROM, programmable ROM (PROM), erasable programmable ROM (EPROM) and/or electrically erasable programmable ROM (EEPROM). Alternatively, or additionally, memory 450 may include a type of non-volatile random-access memory (NVRAM) such as flash memory, solid-state memory, ferroelectric RAM (FeRAM), magnetoresistive RAM (MRAM) and/or phase-change memory.

Under the proposed scheme in accordance with the present disclosure, processor 410 may calibrate a plurality of brake parameters of brake system 420 of vehicle 110 by identifying values of the brake parameters in maneuvering vehicle 110 to a complete stop. Moreover, processor 410 may maneuver, via powertrain system 430, vehicle 110 to stop at a predetermined position with a sub-centimeter precision by applying the brake parameters at the identified values.

In some embodiments, in calibrating the plurality of brake parameters of brake system 420, processor 410 may perform a number of operations. For instance, processor 410 may control powertrain system 430 to maneuver vehicle 110 to travel at a first speed. Additionally, processor 410 may apply a brake profile to brake system 420 to decelerate vehicle 110. Moreover, processor 410 may monitor, via one or more of sensors 440(1)~440(N), the brake parameters as vehicle 110 slows to a stop. Furthermore, processor 410 may calibrate the brake parameters based on the monitoring.

In some embodiments, in maneuvering vehicle 110 to stop at the predetermined position, processor 410 may perform a number of operations. For instance, processor 410 may control powertrain system 430 to maneuver vehicle 110 to travel at a second speed. Additionally, processor 410 may control brake system 420 to decelerate vehicle 110 to stop at the predetermined position by using the calibrated brake parameters.

In some embodiments, the first speed and the second speed may be equal.

In some embodiments, in decelerating vehicle 110 to stop at the predetermined position by using the calibrated brake parameters, processor 410 may perform a number of operations. For instance, processor 410 may detect, via one or more of sensors 440(1)~440(N), a distance between a current position of vehicle 110 and the predetermined position. Moreover, processor 410 may begin to apply the brake profile, via brake system 420, with the brake parameters at calibrated values when the detected distance equals a distance for vehicle 110 to slow to the stop from traveling at the first speed during the calibrating.

In some embodiments, in applying the brake profile to decelerate vehicle 110, processor 410 may transmit a command to brake system 420 to apply a commanded brake torque to decelerate vehicle 110. In some embodiments, in applying the brake profile to decelerate vehicle 110, processor 410 may also increase a value of the commanded brake torque at a predetermined rate. In some embodiments, the predetermined rate may match a brake gain of the brake system.

In some embodiments, in monitoring the brake parameters as vehicle 110 slows to the stop, processor 410 may collect, via one or more of sensors 440(1)~440(N), data pertaining to a commanded brake torque instructed by processor 410 to brake system 420, an actual brake torque applied by brake system 420, and a speed of vehicle 110 from a time when the decelerating of vehicle 110 begins to a time when vehicle 110 stops.

In some embodiments, in maneuvering vehicle 110 to stop at the predetermined position, processor 410 may perform a number of operations. For instance, processor 410 may determine a path from a current position of vehicle 110 to the predetermined position. Additionally, processor 410 may control powertrain system 430 to maneuver vehicle 110 to travel along the path towards the predetermined position.

Figure 5:
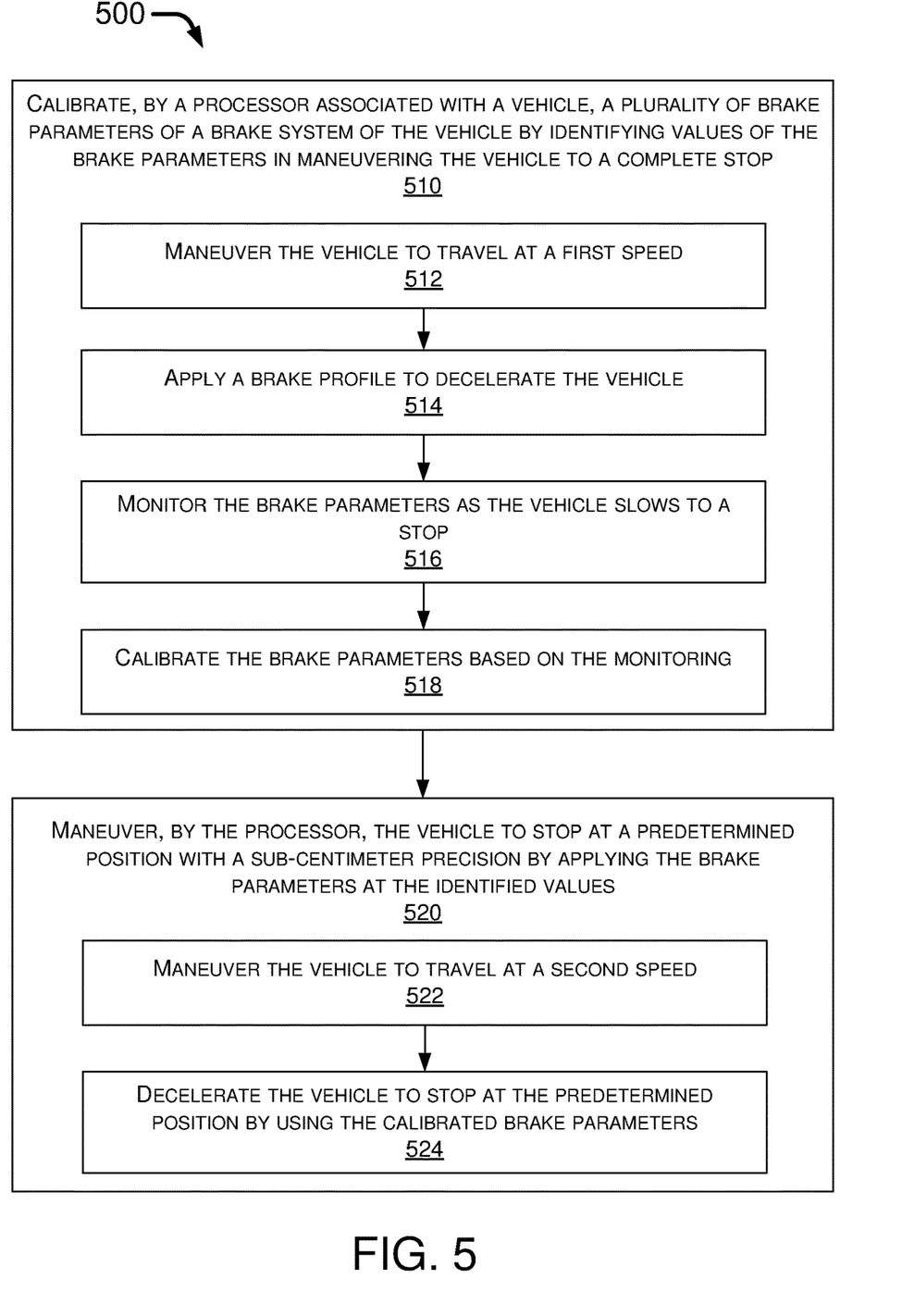
FIG. 5 is a flowchart depicting an example process in accordance with an embodiment of the present disclosure.

FIG. 5 illustrates a flowchart depicting an example process 500 in accordance with an embodiment of the present disclosure. Process 500 may include one or more operations, actions, or functions shown as blocks such as 510 and 520 as well as sub-blocks 512, 514, 516, 518, 522 and 524 of FIG. 5. Although illustrated as discrete blocks, various blocks/sub-blocks of process 500 may be divided into additional blocks, combined into fewer blocks, or eliminated, depending on the desired implementation. Moreover, some or all of the blocks/sub-blocks of FIG. 5 may be repeated. For illustrative purposes and without limitation, the following description of process 500 is provided in the context of scenario 100 with apparatus 400 implemented in vehicle 110. Process 500 may begin at block 510.

At 510, process 500 may involve processor 410 associated with vehicle 110 calibrating a plurality of brake parameters of brake system 420 of vehicle 110 by identifying values of the brake parameters in maneuvering vehicle 110 to a complete stop. Process 500 may proceed from 510 to 520.

At 520, process 500 may involve processor 410 maneuvering, via powertrain system 430, vehicle 110 to stop at a predetermined position with a sub-centimeter precision by applying the brake parameters at the identified values.

In some embodiments, in calibrating the plurality of brake parameters of brake system 420, process 500 may involve processor 410 performing a number of operations as represented by sub-blocks 512, 514, 516 and 518.

At 512, process 500 may involve processor 410 controlling powertrain system 430 to maneuver vehicle 110 to travel at a first speed. Process 500 may proceed from 512 to 514.

At 514, process 500 may involve processor 410 applying a brake profile to brake system 420 to decelerate vehicle 110. Process 500 may proceed from 514 to 516.

At 516, process 500 may involve processor 410 monitoring, via one or more of sensors 440(1)~440(N), the brake parameters as vehicle 110 slows to a stop. Process 500 may proceed from 516 to 518.

At 518, process 500 may involve processor 410 calibrating the brake parameters based on the monitoring.

In some embodiments, in maneuvering vehicle 110 to stop at the predetermined position, process 500 may involve processor 410 performing a number of operations as represented by sub-blocks 522 and 524.

At 522, process 500 may involve processor 410 controlling powertrain system 430 to maneuver vehicle 110 to travel at a second speed. Process 500 may proceed from 522 to 524.

At 524, process 500 may involve processor 410 controlling brake system 420 to decelerate vehicle 110 to stop at the predetermined position by using the calibrated brake parameters.

In some embodiments, the first speed and the second speed may be equal.

In some embodiments, in decelerating vehicle 110 to stop at the predetermined position by using the calibrated brake parameters, process 500 may involve processor 410 performing a number of operations. For instance, process 500 may involve processor 410 detecting, via one or more of sensors 440(1)~440(N), a distance between a current position of vehicle 110 and the predetermined position. Moreover, process 500 may involve processor 410 beginning to apply the brake profile, via brake system 420, with the brake parameters at calibrated values when the detected distance equals a distance for vehicle 110 to slow to the stop from traveling at the first speed during the calibrating.

In some embodiments, in applying the brake profile to decelerate vehicle 110, process 500 may involve processor 410 transmitting a command to brake system 420 to apply a commanded brake torque to decelerate vehicle 110. In some embodiments, in applying the brake profile to decelerate vehicle 110, process 500 may further involve processor 410 increasing a value of the commanded brake torque at a predetermined rate. In some embodiments, the predetermined rate may match a brake gain of the brake system.

In some embodiments, in monitoring the brake parameters as vehicle 110 slows to the stop, process 500 may involve processor 410 collecting, via one or more of sensors 440(1)~440(N), data pertaining to a commanded brake torque instructed by processor 410 to brake system 420, an actual brake torque applied by brake system 420, and a speed of vehicle 110 from a time when the decelerating of vehicle 110 begins to a time when vehicle 110 stops.

In some embodiments, in maneuvering vehicle 110 to stop at the predetermined position, process 500 may involve processor 410 performing a number of operations. For instance, process 500 may involve processor 410 determining a path from a current position of vehicle 110 to the predetermined position. Additionally, process 500 may involve processor 410 controlling powertrain system 430 to maneuver vehicle 110 to travel along the path towards the predetermined position.

In the above disclosure, reference has been made to the accompanying drawings, which form a part hereof, and in which is shown by way of illustration specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
calibrating, by a processor associated with a vehicle, a plurality of brake parameters of a brake system of the vehicle by identifying values of the brake parameters in maneuvering the vehicle to a complete stop; and
maneuvering, by the processor, the vehicle to stop at a predetermined position by applying the brake parameters at the identified values,
wherein the calibrating of the plurality of brake parameters of the brake system comprises:
maneuvering the vehicle to travel at a first speed,
applying a brake profile to decelerate the vehicle,
monitoring the brake parameters as the vehicle slows to a stop; and
calibrating the brake parameters based on the monitoring.

2. The method of claim 1, wherein the maneuvering of the vehicle to stop at the predetermined position comprises:
maneuvering the vehicle to travel at a second speed; and
decelerating the vehicle to stop at the predetermined position by using the calibrated brake parameters.

3. The method of claim 2, wherein the first speed and the second speed are equal.

4. The method of claim 2, wherein the decelerating of the vehicle to stop at the predetermined position by using the calibrated brake parameters comprises:
detecting a distance between a current position of the vehicle and the predetermined position; and
beginning to apply the brake profile with the brake parameters at calibrated values when the detected distance equals a distance for the vehicle to slow to the stop from traveling at the first speed during the calibrating.

5. The method of claim 1, wherein the applying of the brake profile to decelerate the vehicle comprises transmitting a command to the brake system to apply a commanded brake torque to decelerate the vehicle.

6. The method of claim 5, wherein the applying of the brake profile to decelerate the vehicle further comprises increasing a value of the commanded brake torque at a predetermined rate.

7. The method of claim 6, wherein the predetermined rate matches a brake gain of the brake system.

8. The method of claim 1, wherein the monitoring of the brake parameters as the vehicle slows to the stop comprises collecting data pertaining to a commanded brake torque instructed by the processor to the brake system, an actual brake torque applied by the brake system, and a speed of the vehicle from a time when the decelerating of the vehicle begins to a time when the vehicle stops.

9. The method of claim 1, wherein the maneuvering of the vehicle to stop at the predetermined position comprises:
determining a path from a current position of the vehicle to the predetermined position; and
maneuvering the vehicle to travel along the path towards the predetermined position.

10. An apparatus implementable in a vehicle, comprising:
a plurality of sensors capable of monitoring a plurality of aspects of the vehicle; and
a processor communicatively coupled to the plurality of sensors, the processor capable of performing operations comprising:
calibrating a plurality of brake parameters of a brake system of the vehicle; and
maneuvering the vehicle to stop at a predetermined position,
wherein, the calibrating the plurality of brake parameters of the brake system, the processor performs operations comprising:
maneuvering the vehicle to travel at a first speed;
applying a brake profile to decelerate the vehicle;
monitoring the brake parameters as the vehicle slows to a stop, and
calibrating the brake parameters based on the monitoring.

11. The apparatus of claim 10, wherein, in maneuvering the vehicle to stop at the predetermined position, the processor performs operations comprising:
maneuvering the vehicle to travel at a second speed; and
decelerating the vehicle to stop at the predetermined position by using the calibrated brake parameters.

12. The apparatus of claim 11, wherein the first speed and the second speed are equal.

13. The apparatus of claim 11, wherein, in decelerating the vehicle to stop at the predetermined position by using the calibrated brake parameters, the processor performs operations comprising:
detecting a distance between a current position of the vehicle and the predetermined position; and
beginning to apply the brake profile with the brake parameters at calibrated values when the detected distance equals a distance for the vehicle to slow to the stop from traveling at the first speed during the calibrating.

14. The apparatus of claim 10, wherein, in applying the brake profile to decelerate the vehicle, the processor transmits a command to the brake system to apply a commanded brake torque to decelerate the vehicle.

15. The apparatus of claim 14, wherein, in applying the brake profile to decelerate the vehicle, the processor further increases a value of the commanded brake torque at a predetermined rate.

16. The apparatus of claim 15, wherein the predetermined rate matches a brake gain of the brake system.

17. The apparatus of claim 10, wherein, in monitoring the brake parameters as the vehicle slows to the stop, the processor collects from the plurality of sensors data pertaining to a commanded brake torque instructed by the processor to the brake system, an actual brake torque applied by the brake system, and a speed of the vehicle from a time when the decelerating of the vehicle begins to a time when the vehicle stops.

18. The apparatus of claim 10, wherein, in maneuvering the vehicle to stop at the predetermined position, the processor performs operations comprising:
determining a path from a current position of the vehicle to the predetermined position; and
maneuvering the vehicle to travel along the path towards the predetermined position.

* * * * *